(12) United States Patent
Nguyen et al.

(10) Patent No.: US 10,185,686 B2
(45) Date of Patent: Jan. 22, 2019

(54) CONNECTING A PERIPHERAL DEVICE

(71) Applicant: HEWLETT-PACKARD DEVELOPMENT COMPANY, L.P., Houston, TX (US)

(72) Inventors: Michael Nguyen, Houston, TX (US); Binh T Truong, Houston, TX (US); Peter W Austin, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/306,101

(22) PCT Filed: Jul. 28, 2014

(86) PCT No.: PCT/US2014/048452
§ 371 (c)(1),
(2) Date: Oct. 23, 2016

(87) PCT Pub. No.: WO2016/018222
PCT Pub. Date: Feb. 4, 2016

(65) Prior Publication Data
US 2017/0168973 A1    Jun. 15, 2017

(51) Int. Cl.
*G06F 1/16*      (2006.01)
*G06F 13/38*     (2006.01)
(Continued)

(52) U.S. Cl.
CPC ............ *G06F 13/385* (2013.01); *G06F 1/16* (2013.01); *G06F 1/1607* (2013.01);
(Continued)

(58) Field of Classification Search
CPC ..................................................... G06F 1/1632
See application file for complete search history.

(56) References Cited

U.S. PATENT DOCUMENTS 5,825,617 A * 10/1998 Kochis ................. G06F 1/1626
                                                  361/679.43
6,282,088 B1 * 8/2001 Canova ................. G06F 1/1632
                                                  292/8
(Continued)

FOREIGN PATENT DOCUMENTS

CN    10166154 A    3/2010
EP    1082787 B1    7/2007

OTHER PUBLICATIONS

Eclipse™ PF315V+ All-in-One POS System, GenPOS, 2012, 1 page, Available at: <genpos.ca/en/PF315V>.
(Continued)

*Primary Examiner* — Anthony Q Edwards
(74) *Attorney, Agent, or Firm* — International IP Law Group (57) ABSTRACT

The present disclosure describes a peripheral device. The peripheral device includes a device communication port to communicatively couple with a computer communication port on a computer. The peripheral device includes an automatic latch to mechanically secure the peripheral device to the computer by applying pressure in a direction that connects the device communication port and the computer communication port. The peripheral device includes a ground retention clip, to establish surface contact with an exterior surface of the computer to electrically ground the peripheral device.

13 Claims, 6 Drawing Sheets

(51) Int. Cl.
  *G06F 13/40* (2006.01)
  *G06F 13/42* (2006.01)
  *H01R 24/64* (2011.01)
  *H01R 107/00* (2006.01)
(52) U.S. Cl.
  CPC .......... *G06F 1/1684* (2013.01); *G06F 13/409* (2013.01); *G06F 13/4282* (2013.01); *H01R 24/64* (2013.01); *H01R 2107/00* (2013.01)

(56) References Cited

U.S. PATENT DOCUMENTS

| | | | |
|---|---|---|---|
| 7,318,551 B1 | 1/2008 | Mills | |
| 7,433,185 B1 * | 10/2008 | Curran | F16M 11/22 361/679.41 |
| 7,554,800 B2 * | 6/2009 | Bragg | G06F 1/1632 348/373 |
| 8,029,322 B1 | 10/2011 | Oh et al. | |
| 8,369,061 B2 * | 2/2013 | Chu | G06F 1/1656 361/220 |
| 8,496,213 B1 * | 7/2013 | Kunert | B41J 29/02 248/176.1 |
| 8,775,710 B1 * | 7/2014 | Miller | G06F 1/1626 361/679.17 |
| 8,972,617 B2 * | 3/2015 | Hirschman | G06F 3/0219 463/37 |
| 9,678,537 B2 * | 6/2017 | Kupferstein | G06F 1/1632 |
| 2002/0054476 A1 * | 5/2002 | Han | G06F 1/1626 361/679.43 |
| 2004/0073819 A1 | 4/2004 | Sekine et al. | |
| 2004/0093363 A1 * | 5/2004 | Cargin, Jr. | G06F 1/1613 708/131 |
| 2007/0019371 A1 * | 1/2007 | Yang | B60R 11/02 361/679.22 |
| 2010/0066677 A1 | 3/2010 | Garrett et al. | |
| 2012/0057306 A1 | 3/2012 | Liu | |
| 2012/0266235 A1 | 10/2012 | Majdic | |
| 2013/0109316 A1 * | 5/2013 | Lee | H04M 1/725 455/41.2 |
| 2013/0167226 A1 | 6/2013 | Lin | |
| 2013/0196527 A1 * | 8/2013 | Joe | H01R 13/6278 439/296 |
| 2013/0311314 A1 | 11/2013 | Fernando et al. | |
| 2014/0327998 A1 * | 11/2014 | Barneron | G06K 7/0082 361/220 |
| 2016/0249476 A1 * | 8/2016 | Rohmer | H05K 5/02 |
| 2017/0344065 A1 * | 11/2017 | Kupferstein | F16M 13/022 |

OTHER PUBLICATIONS

ER689AA—HP rp5000 Point of Sale System P4 2.4 GHz 256M/40G LAN WXP WEPOS, pp. 1-17, Hewlett-Packard Company, Available at: <10057.www1ho.com/ecomcat/hpcatalog/provisioner/05/ER689AA.htm>.

How Do I Change the Swappable Interface on My Star Printer?—Barcoding News, BarcodesInc, Dec. 13, 2012, 1 page, Available at: <barcodesinc.com/news/?p=7157#more-7157>.

* cited by examiner

CONNECTING A PERIPHERAL DEVICE

BACKGROUND

A peripheral device typically connects to another computing device to provide additional functionality. Peripheral devices may include a number of different devices, such as a magnetic card reader, camera, printer, biometric sensor, and many others. In a number of working environments, it is useful to have the peripheral device secured to the computing device in a stable position. For example, at a point of sale, i.e., cash register, the card reader is installed so that the force of swiping the card through the reader does not disconnect, or possibly damage, the two devices.

BRIEF DESCRIPTION OF THE DRAWINGS

Certain exemplary embodiments are described in the following detailed description and in reference to the drawings, in which.

DETAILED DESCRIPTION

Connected peripheral devices are secured to the computing device using two screws on either side of the communication port. However, attaching and removing the peripheral device can be time consuming and tedious. The screws may not be accessible from outside the device, meaning parts of the computing device are removed just to get to the screws. Further, there may be various types of screws. As such, a tool such as a screwdriver may not be useful. Instead, the tool may be provided by the peripheral device manufacturer. This means that if the tool is lost somewhere between the manufacturer, reseller, and the customer, the customer may not be able install the device until ordering, and receiving, a replacement tool. Accordingly, an alternative to connecting peripheral devices may be useful.

Figure 1A:
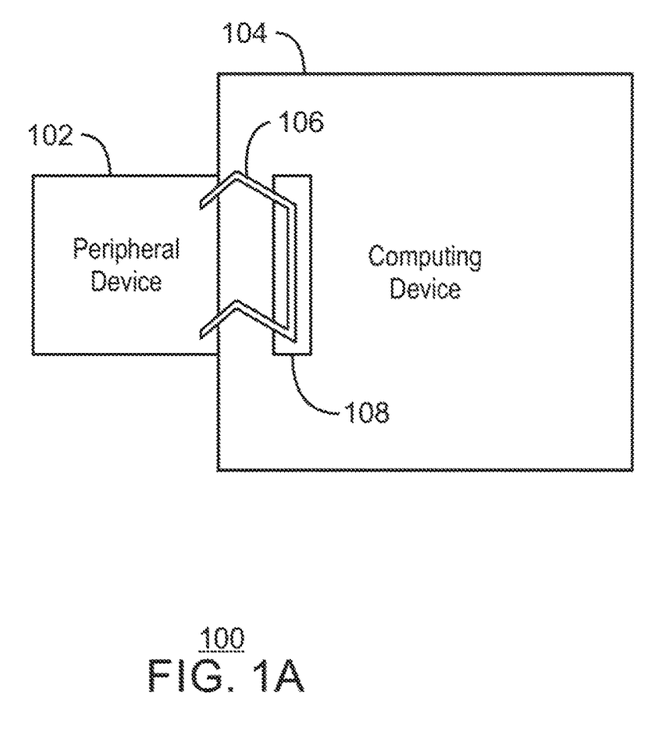
FIGS. 1A-1B are block diagrams of an example system or connecting a peripheral device.
Figure 1B:
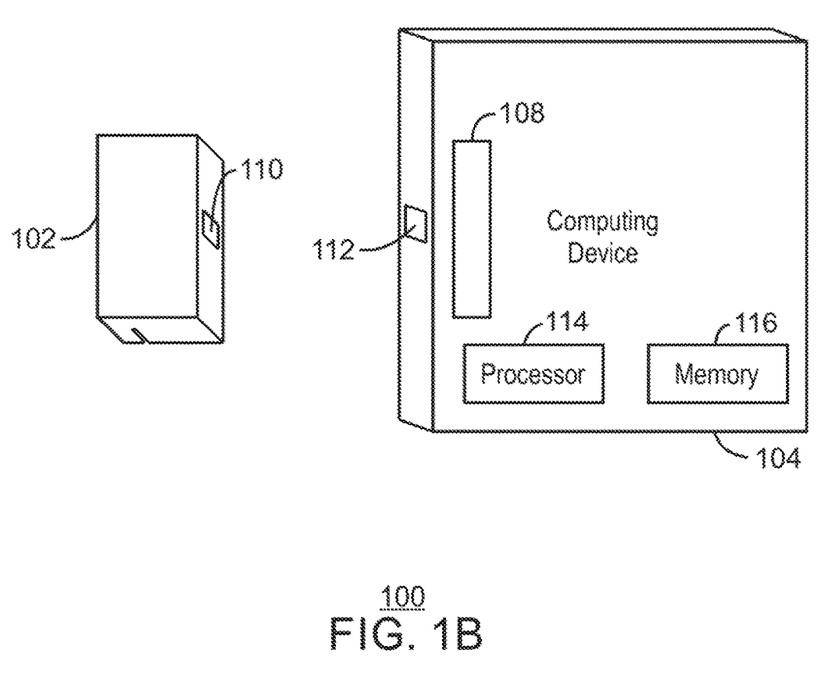

Examples of the claimed subject matter provide peripheral devices and computing devices that may be stably connected at a communication port, and disconnected from the port, without tools. These examples enable faster connection and disconnection times than possible between current peripheral and computing devices. Examples are described in greater detail with respect to FIG. 1.

FIG. 1A is a front view of a system 100 for securing a peripheral device 102 to a computing device 104, in accordance with examples. The peripheral device 102 can be coupled to the computing device 104 to provide additional functionality. The peripheral device 102 refers to a modular device with small form factor that adds functionality to the computing device 104 by communicatively coupling to the computer via a communication port. The peripheral device 102 may be a web cam, a bar code scanner, a card reader, a finger print scanner, or a reverse-facing display screen. The computing device 104 may be a standard desktop computer, a desktop with all-in-one form factor, a tablet computer, laptop computer, point of sale device, and so on. In addition to the communicative connection, the peripheral device 102 is mechanically secured to the computing device 104 such that the peripheral device 102 stays rigid in relation to the computing device 104.

The peripheral device 102 includes a cross-bar level 106 that is disposed within a receptacle 108 of the computing device 104. In one example, the cross-bar lever 106 automatically locks upon insertion. The cross-bar lever 106 latches onto the computing device 104 to lock the devices 102, 104 into position for stability. When connected, the cross-bar lever 106 is fixed within the receptacle 108. The cross-bar lever 106 constrains any degree of motion between the peripheral device 102 and the computing device 104. Additionally, the cross-bar lever 106 may be spring loaded to a position that maintains the rigid relationship between the devices 102, 104. To disconnect the device 102, a tab lever (not shown) may be pulled, which lifts the cross-bar lever 106 from the receptacle 108. In this position, it is possible to disconnect the peripheral device 102 from the computing device 104. The tab lever may be used to secure and eject the cross-bar lever 106.

In an example of the claimed subject matter, the tab lever may be attached to the cross-bar lever 106. By applying pressure to the tab, the latch 106 may be automatically locked into the receptacle, or lifted from the receptacle 108. In another example, the tab lever may be incorporated within the peripheral device 102 as a button that pops up when the devices 102, 104 are connected. Accordingly, while the devices 102, 104 remain connected, pressing the tab-lever button lifts the cross-bar lever 106 from the receptacle. In another example, a tab-lever button may be incorporated within the computing device 104. The tab-levers described here are merely examples, and not an exhaustive list. Rather, any tab-lever capable of automatically locking the cross-bar lever 106 into the receptacle 108, or automatically lifting the cross-bar lever 106 from the receptacle 108 may be used.

FIG. 1B is a side perspective vie of the peripheral device 102 and the computing device 104, in accordance with examples. The peripheral device 102 includes a device communication port 110. Correspondingly, the computing device 104 includes a computer communication port 112. The device communication port 110 and the computer communication port 112 may utilize any number of communications protocols, proprietary, industry-standard, and so on. For example, the device communication port 110 and the computer communication port 112 may be Universal Serial Bus (USB) ports. When connected, the device communication port 110 is connected with the computer communication port 112. The computing device 104 also includes a processor 114, and a system memory 116. The processor 114 executes computer instructions stored in system memory 116.

Figure 2A:
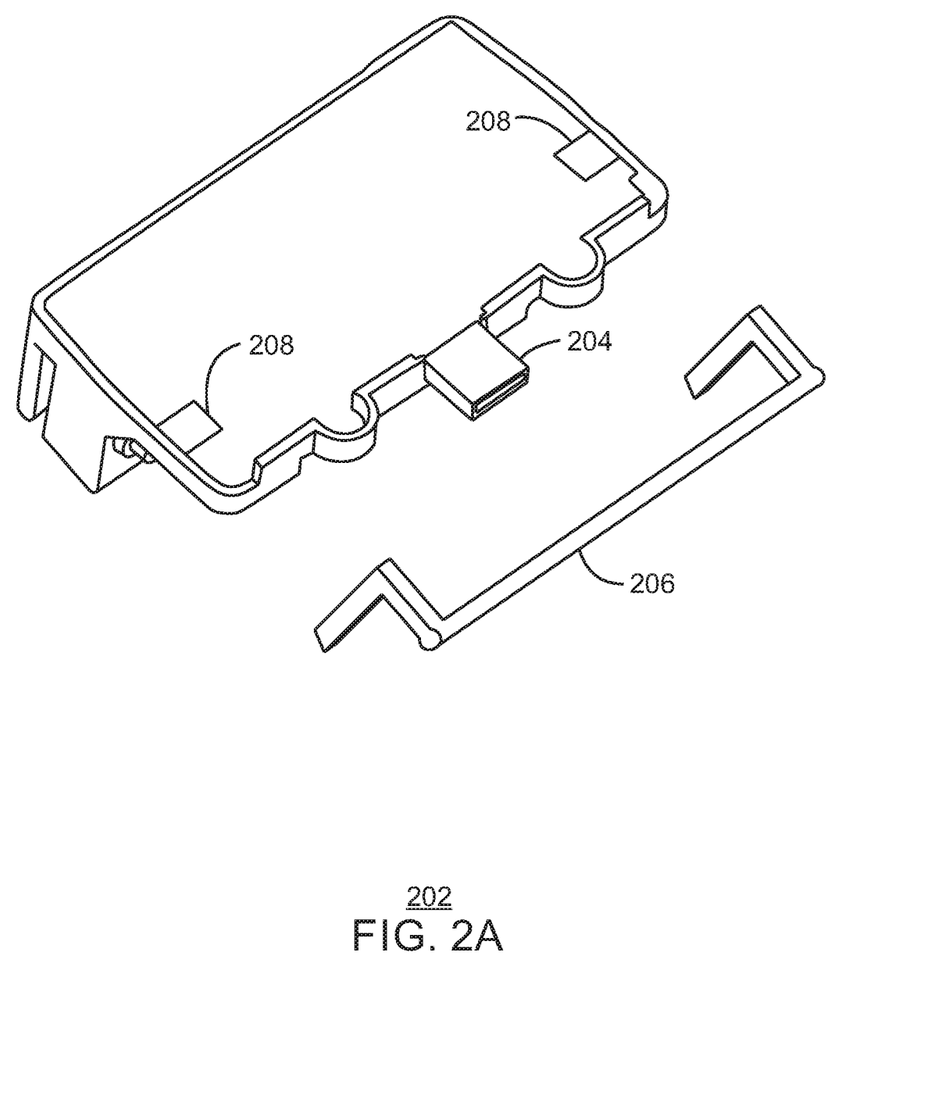
FIGS. 2A-2C are block diagrams of example peripheral device for connecting to a computing device.

FIG. 2A is a back perspective view of a magnetic card reading peripheral device 202 and cross-bar lever 206, in accordance with examples. The device 202 includes USB communication port 204 and lever attachments 208. The lever attachments 208 may provide a receptacle for securing the cross-bar level 206 to the device 202. In one example, the attachments 208 may include springs (not shown) that provide a range of motion for the device 202 in relation to the cross-bar lever 206. Additionally, such springs may return the device 202 to a position for connecting the device 202 to an example computing device 104.

All peripheral devices 102 have electromagnetic compatibility (EMC) regulations with which to conform. These regulations enable the safe operation of electronic devices, and require that electronic devices provide a ground metal contact. Currently, the screws used to secure typical peripheral devices also provide this ground metal contact. However, example peripheral devices 102 do not include screws to secure the peripheral device 102 to the computing device.

Accordingly, example peripheral devices 102 provide ground metal contact without the use of screws. Instead of screws, peripheral devices 102 include a ground retention clip that provide ground metal contacts between the peripheral device 202 and the computing device 104. The ground retention clip is described in greater detail with respect to FIGS. 2B, 2C, and 3.

Figure 2B:
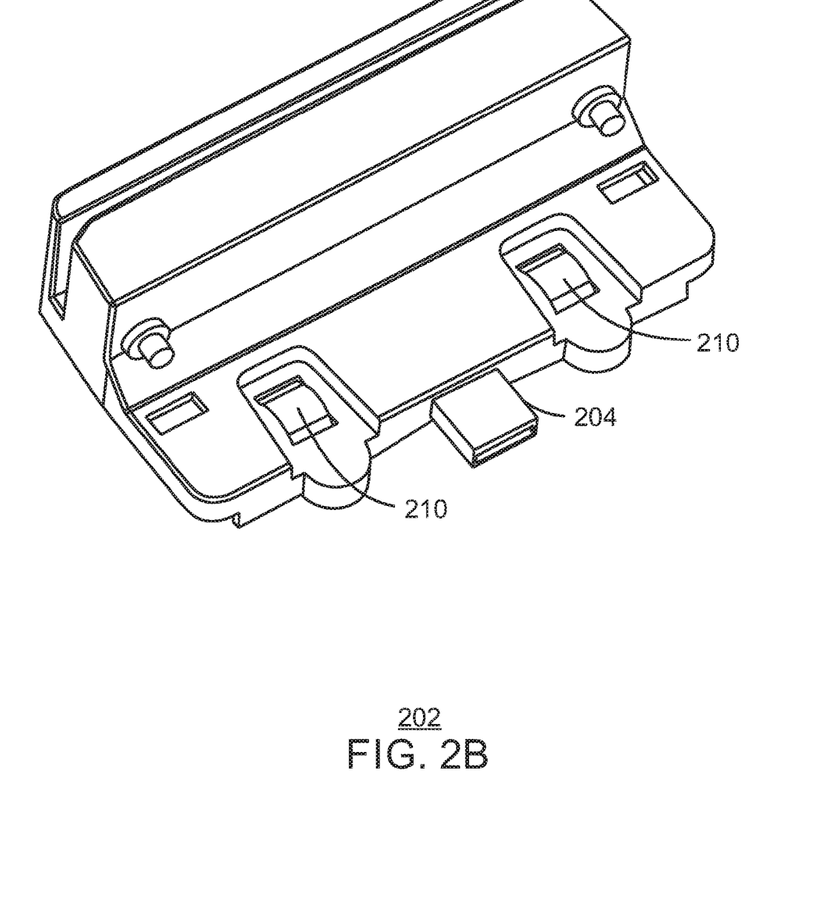

FIG. 2B is a front perspective view of the device 202, in accordance with examples. The device 202 includes the USB port 204 and ground metal contacts 210. When the peripheral device 202 is connected, the ground metal contacts 210 provide contact between the computing device 104 and a chassis of the peripheral device. The ground metal contacts 210 are exposed surfaces of the ground retention clip, which is secured within the device 202.

Figure 2C:
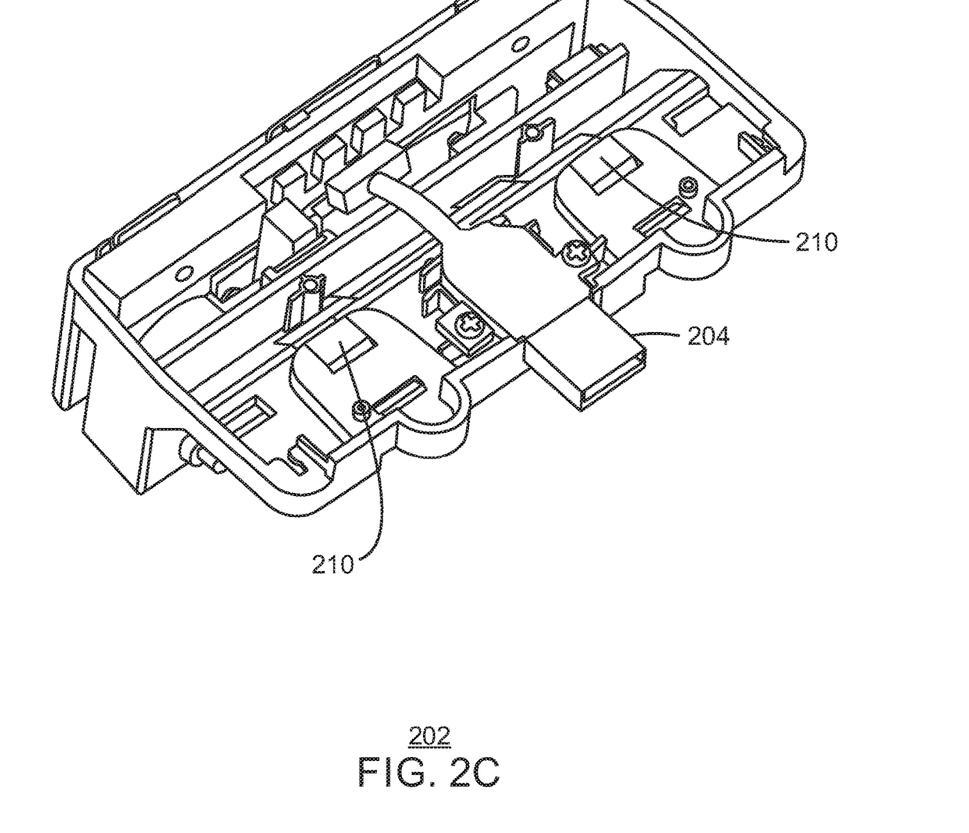

FIG. 2C is a bottom perspective view of the device 202 with covering removed, in accordance with examples. The device includes a ground retention clip, secured to, and in contact with, the chassis of the device 202. The surface of the ground retention clip is exposed through an opening, providing the ground metal contacts 210.

Figure 3:
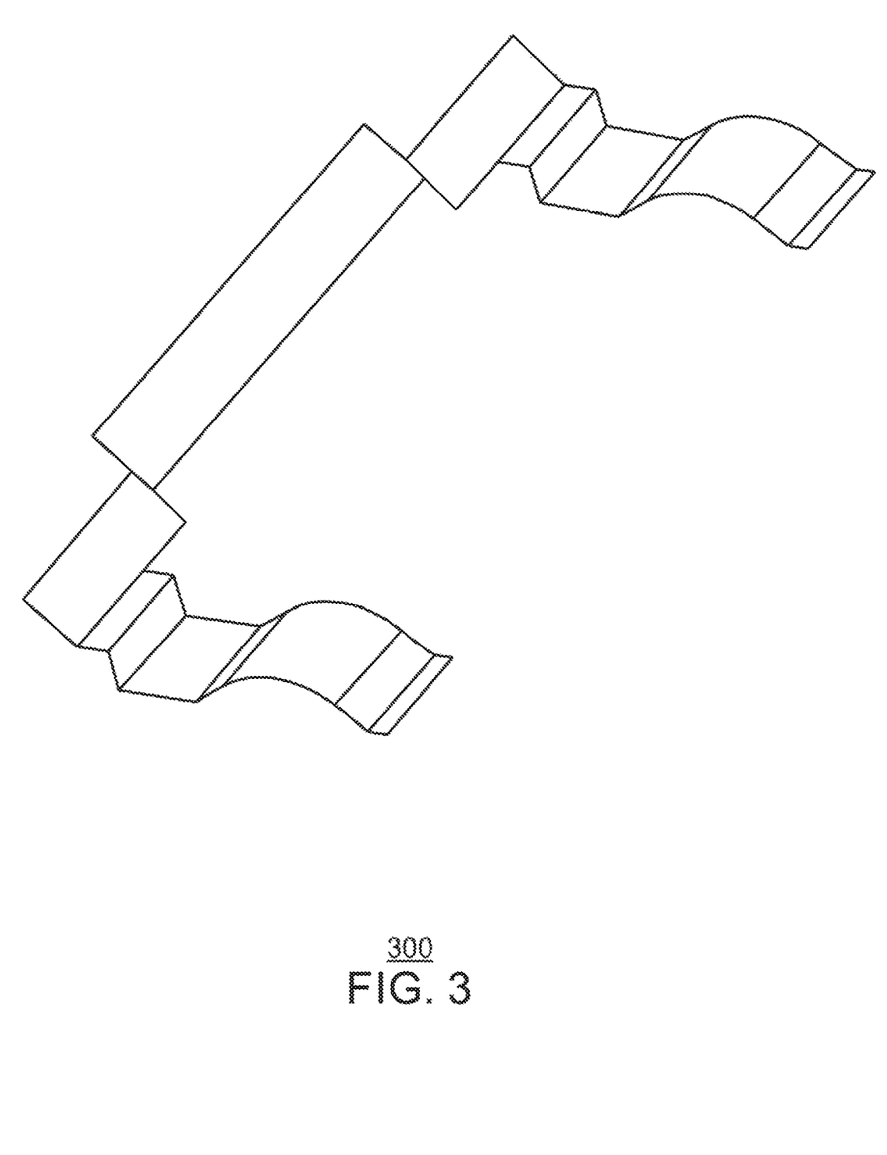
FIG. 3 is a block diagram of an example ground retention clip, in accordance with examples.

FIG. 3 is a block diagram of an example ground retention clip 300, in accordance with examples. Example peripheral devices 102 may include a ground retention clip 300 to provide grounding contact with a connected computing device 104. The ground retention clip 300 is installed within the peripheral device 102 such that the clip 300 is in electrical contact with the chassis of the peripheral device 102. Additionally, once installed in the peripheral device 102, a portion of the clip 300 is externally exposed to provide the electrical contacts to the computing device 104. It is noted that examples of the claimed subject matter are not limited to the design shown in FIG. 3. Rather, the ground retention clip 300 may be of any shape that, when installed, provides electrical contact with the chassis, and electric contact with the computing device 104, once secured.

Advantageously, a tool is not needed to connect or disconnect example peripheral devices. This tool-less technique enables suppliers and resellers of connected devices 102, 104 to reduce the time for assembly. This time savings translates to cost savings. Original design manufacturers, suppliers and resellers, who sell connected peripheral and computing devices, can save expenses in assembling example systems. In addition, faster service repair and replacement is possible with example systems because the peripheral devices 102 can be disconnected without tools.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A peripheral device, comprising:
   a device communication port to communicatively couple with a computer communication port on a computer;
   an automatic latch to mechanically secure the peripheral device to the computer by applying pressure in a direction that connects the device communication port and the computer communication port, wherein the automatic latch comprises a cross-bar lever; and
   a ground retention clip to establish surface contact with an exterior surface of the computer to electrically ground the peripheral device.

2. The peripheral device of claim 1, wherein the automatic latch is detached by applying pressure to a cross-lever tab.

3. The peripheral device of claim 2, wherein the peripheral device comprises the cross-lever tab.

4. The peripheral device of claim 1, wherein the automatic latch comprises a spring to maintain the position of the automatic latch.

5. The peripheral device of claim 1, wherein the automatic latch mechanically secures the peripheral device to the computer such that the peripheral device stays rigid in relation to the computer.

6. A computing device, comprising:
   a processor;
   a computer communication port for connecting to a corresponding communication port of a peripheral device comprising an automatic latch to mechanically secure the peripheral device to the computing device wherein the automatic latch comprises a cross-bar lever; and
   a chassis comprising a latch receptacle for receiving the automatic latch to mechanically secure the peripheral device to the computing device, the chassis being in contact with a ground retention surface of the peripheral device when the peripheral device is mechanically secured.

7. The computing device of claim 6, wherein the computer communication port is a Universal Serial Bus (USB) port.

8. The computing device of claim 6, comprising a device tab used to lock and releases the cross-bar lever.

9. The computing device of claim 6, wherein the peripheral device maintains a rigid relationship to the computing device when mechanically secured.

10. A system for connecting a peripheral device to a computing device, comprising:
    a computing device comprising a communication port and a latch receptacle;
    a peripheral device, comprising:
       a device communication port, to communicatively couple with a computer communication port on a computer;
       an automatic latch comprising a cross-bar lever, to mechanically secure the peripheral device to the computer by applying pressure in a direction that connects the device communication port and the computer communication port; and
       a ground retention clip, to establish surface contact with an exterior surface of the computing device to electrically ground the peripheral device.

11. The system of claim 10, wherein the wherein the automatic latch is automatically detached by applying pressure to a cross-lever tab.

12. The system of claim 10, wherein the automatic latch comprises a spring to maintain the position of the automatic latch.

13. The system of claim 10, wherein the peripheral device stays rigid in relation to the computing device when mechanically secured.

* * * * *

UNITED STATES PATENT AND TRADEMARK OFFICE
CERTIFICATE OF CORRECTION

PATENT NO. : 10,185,686 B2
APPLICATION NO. : 15/306101
DATED : January 22, 2019
INVENTOR(S) : Michael Nguyen et al.

Page 1 of 1

It is certified that error appears in the above-identified patent and that said Letters Patent is hereby corrected as shown below:

In the Claims

In Column 4, Claim 6, Line 21, delete "device" and insert -- device, --, therefor.

In Column 4, Claim 11, Line 53, delete "wherein the wherein the" and insert -- wherein the --, therefor.

Signed and Sealed this
Twenty-sixth Day of March, 2019

Andrei Iancu
*Director of the United States Patent and Trademark Office*